United States Patent
O'Brien et al.

(10) Patent No.: US 10,757,262 B1
(45) Date of Patent: Aug. 25, 2020

(54) TECHNIQUES FOR DECISIONING BEHAVIORAL PAIRING IN A TASK ASSIGNMENT SYSTEM

(71) Applicant: Afiniti, Ltd., Hamilton (BM)

(72) Inventors: Caroline O'Brien, Bondi (AU); Julian Lopez-Portillo, Mexico City (MX); Karl Garbacik, Arlington, VA (US); Ittai Kan, McLean, VA (US)

(73) Assignee: Afiniti, Ltd., Hamilton (BM)

( * ) Notice: Subject to any disclaimer, the term of this patent is extended or adjusted under 35 U.S.C. 154(b) by 0 days.

(21) Appl. No.: 16/576,434

(22) Filed: Sep. 19, 2019

(51) Int. Cl.
*H04M 3/51* (2006.01)
*H04M 3/523* (2006.01)

(52) U.S. Cl.
CPC ................. *H04M 3/5232* (2013.01)

(58) Field of Classification Search
CPC .................................................. H04M 3/5232
USPC ........................................ 379/265.11–265.14
See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,021,428 A | 2/2000 | Miloslavsky |
| 6,044,355 A | 3/2000 | Crockett et al. |
| 6,044,468 A | 3/2000 | Osmond |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Afiniti, "Afiniti® Enterprise Behavioral Pairing™ Improves Contact Center Performance," White Paper, retrieved online from URL: <http://www.afinitit,com/wp-content/uploads/2016/04/Afiniti_White-Paper_Web-Email.pdf> 2016, (11 pages).

(Continued)

*Primary Examiner* — Harry S Hong
(74) *Attorney, Agent, or Firm* — Wilmer Cutler Pickering Hale and Dorr LLP

(57) ABSTRACT

Techniques for decisioning behavioral pairing in a task assignment system are disclosed. In one particular embodiment, the techniques may be realized as a method for decisioning behavioral pairing in a task assignment system comprising: determining, by at least one computer processor communicatively coupled to and configured to operate in the task assignment system, a plurality of possible task-agent pairings among at least one task waiting for assignment and at least one agent available for assignment; and selecting, by the least one computer processor for assignment in the task assignment system, a first task-agent pairing of the plurality of possible task-agent pairings based at least in part on a first offer set to be offered by the agent or a first compensation to be received by the agent.

21 Claims, 3 Drawing Sheets

Task Assignment Method
300

(56) References Cited

U.S. PATENT DOCUMENTS

| | | |
|---|---|---|
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,519,568 B1 | 2/2003 | Harvey et al. |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,372,952 B1 | 5/2008 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B1 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,856,869 B1 | 10/2014 | Brinskelle |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| RE46,986 E | 8/2018 | Chishti et al. |
| 10,135,987 B1 | 11/2018 | Chishti et al. |
| RE47,201 E | 1/2019 | Chishti et al. |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |

(56) References Cited

U.S. PATENT DOCUMENTS

| | | |
|---|---|---|
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0206199 A1 | 8/2011 | Arora |
| 2012/0051536 A1 | 3/2012 | Chishti et al. |
| 2012/0051537 A1 | 3/2012 | Chishti et al. |
| 2012/0173355 A1* | 7/2012 | Smith .................. G06Q 10/00 705/26.1 |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0013131 A1 | 1/2017 | Craib |
| 2017/0064080 A1 | 3/2017 | Chishti et al. |
| 2017/0064081 A1 | 3/2017 | Chishti et al. |
| 2017/0316438 A1 | 11/2017 | Konig et al. |
| 2018/0159977 A1* | 6/2018 | Danson ............... H04M 3/5158 |
| 2019/0068787 A1* | 2/2019 | Chishti ............... H04M 3/5232 |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |
| EP | 1032188 A1 | 8/2000 |
| EP | 1107557 A2 | 6/2001 |
| EP | 1335572 A2 | 8/2003 |
| EP | 2338270 B1 | 4/2018 |
| GB | 2339643 A | 2/2000 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-069168 A | 3/2002 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |

(56) References Cited

FOREIGN PATENT DOCUMENTS

| | | |
|---|---|---|
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| JP | 2015-514268 A | 5/2015 |
| JP | 2015-514371 A | 5/2015 |
| KR | 10-2002-0044077 A | 6/2002 |
| KR | 10-2013-0099554 A | 9/2013 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| PH | 1-2011-500868 | 6/2015 |
| WO | WO-99/17517 A1 | 4/1999 |
| WO | WO-00/70849 A2 | 11/2000 |
| WO | WO-2001/063894 A2 | 8/2001 |
| WO | WO-2006/124113 A2 | 11/2006 |
| WO | WO-2009/097018 A1 | 8/2009 |
| WO | WO-2009/097210 A1 | 8/2009 |
| WO | WO-2010/053701 A2 | 5/2010 |
| WO | WO-2011/081514 A1 | 7/2011 |
| WO | WO-2013/148453 A1 | 10/2013 |
| WO | WO-2015/019806 A1 | 2/2015 |
| WO | WO-2016/048290 A1 | 3/2016 |

OTHER PUBLICATIONS

Anonymous, (2006) "Performance Based Routing in Profit Call Centers," The Decision Makers' Direct, located at www.decisioncraft. com, Issue Jun. 2002, (3 pages).

Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).

Cleveland, William S., "Robust Locally Weighted Regression and Smoothing Scatterplots," Journal of the American Statistical Association, vol. 74, No. 368, pp. 829-836 (Dec. 1979).

Cormen, T.H., et al., "Introduction to Algorithms", Third Edition, Chapter 26 and 29, 2009, (116 pages).

Gans, N. et al., "Telephone Call Centers: Tutorial, Review and Research Prospects," Manufacturing & Service Operations Management, vol. 5, No. 2, 2003, pp. 79-141, (84 pages).

Ioannis Ntzoufras "Bayesian Modeling Using Winbugs an Introduction", Department of Statistics, Athens University of Economics and Business, Wiley-Interscience, A John Wiley & Sons, Inc., Publication, Chapter 5, Jan. 1, 2007, pp. 155-220 (67 pages).

Koole, G. et al., "An Overview of Routing and Staffing Algorithms in Multi-Skill Customer Contact Centers," Manuscript, Mar. 6, 2006, (42 pages).

Koole, G., "Performance Analysis and Optimization in Customer Contact Centers," Proceedings of the Quantitative Evaluation of Systems, First International Conference, Sep. 27-30, 2004, (4 pages).

Nocedal, J. and Wright, S. J., "Numerical Optimization," Chapter 16 Quadratic Programming, 2006, pp. 448-496 (50 pages).

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al., "A Direct Adaptive Method for Faster Backpropagation Learning: The RPROP Algorithm," 1993 IEEE International Conference on Neural Networks, San Francisco, CA, Mar. 28-Apr. 1, 1993, 1:586-591 (8 pages).

Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).

* cited by examiner

TECHNIQUES FOR DECISIONING BEHAVIORAL PAIRING IN A TASK ASSIGNMENT SYSTEM

FIELD OF THE DISCLOSURE

The present disclosure generally relates to behavioral pairing and, more particularly, to techniques for decisioning behavioral pairing in a task assignment system.

BACKGROUND OF THE DISCLOSURE

A typical task assignment system algorithmically assigns tasks arriving at a task assignment center to agents available to handle those tasks. At times, the task assignment center may be in an "L1 state" and have agents available and waiting for assignment to tasks. At other times, the task assignment center may be in an "L2 state" and have tasks waiting in one or more queues for an agent to become available for assignment.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

In other typical task assignment centers, a performance-based routing (PBR) strategy for prioritizing higher-performing agents for task assignment may be implemented. Under PBR, for example, the highest-performing agent among available agents receives the next available task. Other PBR and PBR-like strategies may make assignments using specific information about the agents.

"Behavioral Pairing" or "BP" strategies, for assigning tasks to agents, improve upon traditional assignment methods. BP targets balanced utilization of agents while simultaneously improving overall task assignment center performance potentially beyond what FIFO or PBR methods will achieve in practice.

In some task assignment systems, it may be advantageous to consider the next-best action for a task given its assignment to a particular agent. Thus, it may be understood that there may be a need for a decisioning BP strategy that takes into consideration the next-best action for a task-agent pairing in order to optimize the overall performance of the task assignment system.

SUMMARY OF THE DISCLOSURE

Techniques for decisioning behavioral pairing in a task assignment system are disclosed. In one particular embodiment, the techniques may be realized as a method for decisioning behavioral pairing in a task assignment system comprising: determining, by at least one computer processor communicatively coupled to and configured to operate in the task assignment system, a plurality of possible task-agent pairings among at least one task waiting for assignment and at least one agent available for assignment; and selecting, by the least one computer processor for assignment in the task assignment system, a first task-agent pairing of the plurality of possible task-agent pairings based at least in part on a first offer set to be offered by the agent or a first compensation to be received by the agent.

In accordance with other aspects of this particular embodiment, the task assignment system may be a contact center system.

In accordance with other aspects of this particular embodiment, selecting the first task-agent pairing may be based at least in part on both the first offer set and the first compensation.

In accordance with other aspects of this particular embodiment, the method may further comprise selecting, by the at least one computer processor, the first offer set from a plurality of potential offer sets.

In accordance with other aspects of this particular embodiment, the method may further comprise selecting, by the at least one computer processor, the first compensation from a plurality of potential compensations.

In accordance with other aspects of this particular embodiment, selecting the first task-agent pairing may be based on at least one of a first ordering of a plurality of tasks and a second ordering of a plurality of agents, and wherein the at least one of the first and second orderings is expressed as percentiles or percentile ranges.

In accordance with other aspects of this particular embodiment, the method may further comprise adjusting, by the at least one computer processor, the first offer set or the first compensation to adjust the first or second orderings.

In another particular embodiment, the techniques may be realized as a system for decisioning behavioral pairing in a task assignment system comprising at least one computer processor communicatively coupled to and configured to operate in the task assignment system, wherein the at least one computer processor is further configured to perform the steps in the above-described method.

In another particular embodiment, the techniques may be realized as an article of manufacture for decisioning behavioral pairing in a task assignment system comprising a non-transitory processor readable medium and instructions stored on the medium, wherein the instructions are configured to be readable from the medium by at least one computer processor communicatively coupled to and configured to operate in the task assignment system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
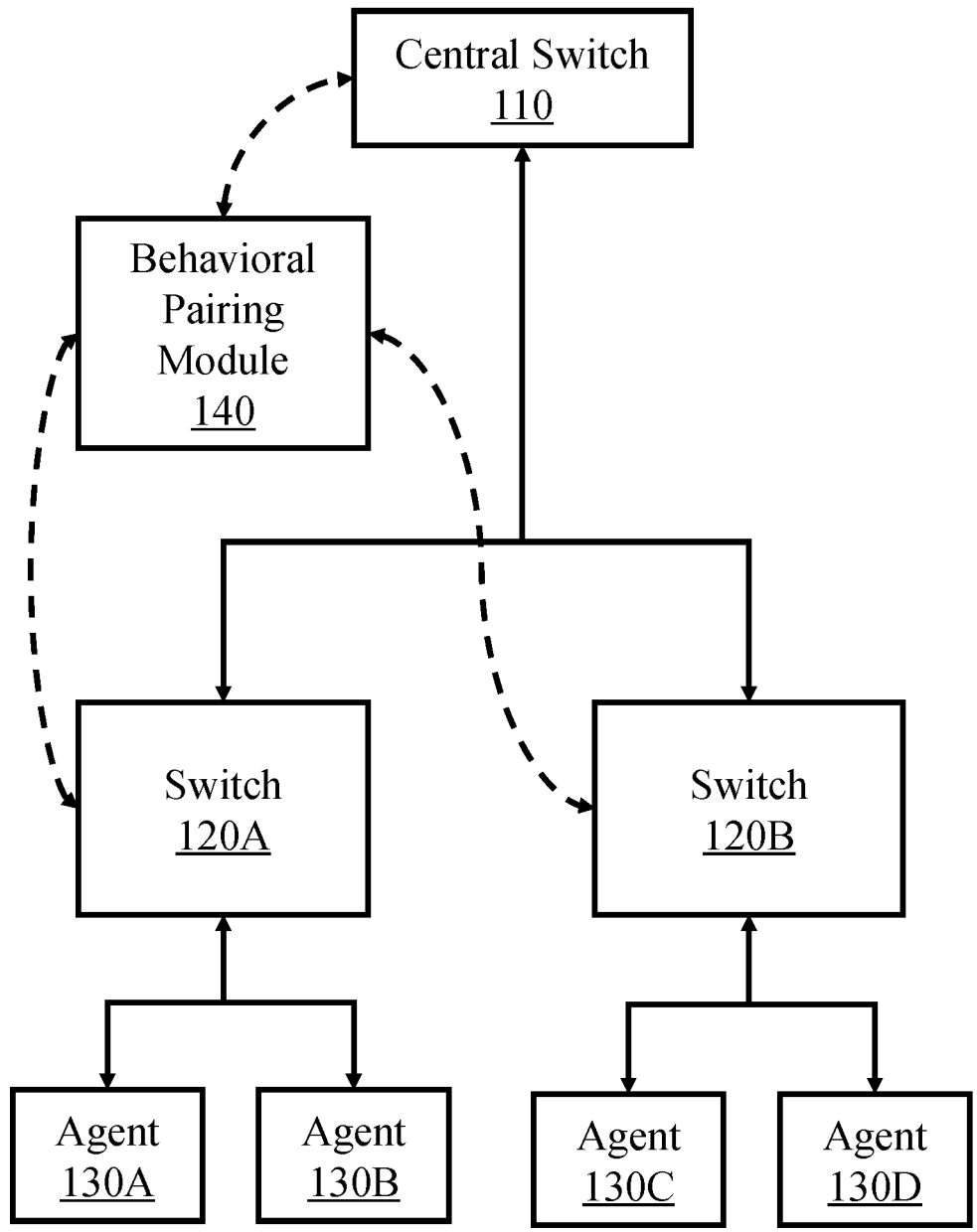
FIG. 1 shows a block diagram of a task assignment center according to embodiments of the present disclosure.

A typical task assignment system algorithmically assigns tasks arriving at a task assignment center to agents available to handle those tasks. At times, the task assignment center may be in an "L1 state" and have agents available and waiting for assignment to tasks. At other times, the task assignment center may be in an "L2 state" and have tasks waiting in one or more queues for an agent to become available for assignment. At yet other times, the task assignment system may be in an "L3" state and have multiple agents available and multiple tasks waiting for assignment. An example of a task assignment system is a contact center system that receives contacts (e.g., telephone calls, internet chat sessions, emails, etc.) to be assigned to agents.

In some traditional task assignment centers, tasks (e.g., callers) are assigned to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent. In other traditional task assignment centers, a performance-based routing (PBR) strategy for prioritizing higher-performing agents for task assignment may be implemented. Under PBR, for example, the highest-performing agent among available agents receives the next available task.

The present disclosure refers to optimized strategies, such as "Behavioral Pairing" or "BP" strategies, for assigning tasks to agents that improve upon traditional assignment methods. BP targets balanced utilization of agents while simultaneously improving overall task assignment center performance potentially beyond what FIFO or PBR methods will achieve in practice. This is a remarkable achievement inasmuch as BP acts on the same tasks and same agents as FIFO or PBR methods, approximately balancing the utilization of agents as FIFO provides, while improving overall task assignment center performance beyond what either FIFO or PBR provide in practice. BP improves performance by assigning agent and task pairs in a fashion that takes into consideration the assignment of potential subsequent agent and task pairs such that, when the benefits of all assignments are aggregated, they may exceed those of FIFO and PBR strategies.

Various BP strategies may be used, such as a diagonal model BP strategy or a network flow (or "off-diagonal") BP strategy. These task assignment strategies and others are described in detail for a contact center context in, e.g., U.S. Pat. Nos. 9,300,802; 9,781,269; 9,787,841; and 9,930,180; all of which are hereby incorporated by reference herein. BP strategies may be applied in an L1 environment (agent surplus, one task; select among multiple available/idle agents), an L2 environment (task surplus, one available/idle agent; select among multiple tasks in queue), and an L3 environment (multiple agents and multiple tasks; select among pairing permutations).

The various BP strategies discussed above may be considered two-dimensional (2-D), where one dimension relates to the agents, and the second dimension relates to the tasks (e.g., callers), and the various BP strategies take into account information about agents and tasks to pair them. As explained in detail below, embodiments of the present disclosure relate to decisioning BP strategies that account for higher-dimensional assignments. For a three-dimensional (3-D) example, the BP strategy may assign an agent to both a task and a set of offers the agent can make or a set of actions the agent can take during the task assignment. For another 3-D example, the BP strategy may assign an agent to both a task and a (monetary or non-monetary) reward to be given to an agent for a given task assignment. For a four-dimensional (4-D) example, the BP strategy may assign an agent to a task, an offer set, and a reward.

These decisioning BP strategies may also consider historical outcome data for, e.g., agent-task-offers, agent-task-reward, or agent-task-offer-reward pairings to build a BP model and apply a BP strategy to "pair" a task with an agent and a specific offer set and/or agent compensation (throughout the specification, the noun and verb "pair" and other forms such as "Behavioral Pairing" may be used to describe triads and higher-dimensional groupings).

FIG. 1 shows a block diagram of a task assignment center 100 according to embodiments of the present disclosure. The description herein describes network elements, computers, and/or components of a system and method for pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the task assignment center 100 may include a central switch 210. The central switch 110 may receive incoming tasks (e.g., telephone calls, internet chat sessions, emails, etc.) or support outbound connections to contacts via a dialer, a telecommunications network, or other modules (not shown). The central switch 110 may include routing hardware and software for helping to route tasks among one or more subcenters, or to one or more Private Branch Exchange ("PBX") or Automatic Call Distribution (ACD) routing components or other queuing or switching components within the task assignment center 100. The central switch 110 may not be necessary if there is only one subcenter, or if there is only one PBX or ACD routing component in the task assignment center 100.

If more than one subcenter is part of the task assignment center 100, each subcenter may include at least one switch (e.g., switches 120A and 120B). The switches 120A and 120B may be communicatively coupled to the central switch 110. Each switch for each subcenter may be communicatively coupled to a plurality (or "pool") of agents. Each switch may support a certain number of agents (or "seats") to be logged in at one time. At any given time, a logged-in agent may be available and waiting to be connected to a task, or the logged-in agent may be unavailable for any of a number of reasons, such as being connected to another contact, performing certain post-call functions such as logging information about the call, or taking a break. In the example of FIG. 1, the central switch 110 routes tasks to one of two subcenters via switch 120A and switch 120B, respectively. Each of the switches 120A and 120B are shown with two agents each. Agents 130A and 130B may be logged into switch 120A, and agents 130C and 130D may be logged into switch 120B.

The task assignment center 100 may also be communicatively coupled to an integrated service from, for example, a third-party vendor. In the example of FIG. 1, behavioral pairing module 140 may be communicatively coupled to one or more switches in the switch system of the task assignment center 100, such as central switch 110, switch 120A, and switch 120B. In some embodiments, switches of the task assignment center 100 may be communicatively coupled to multiple behavioral pairing modules. In some embodiments, behavioral pairing module 140 may be embedded within a component of the task assignment center 100 (e.g., embedded in or otherwise integrated with a switch).

Behavioral pairing module 140 may receive information from a switch (e.g., switch 120A) about agents logged into the switch (e.g., agents 130A and 130B) and about incoming tasks via another switch (e.g., central switch 110) or, in some embodiments, from a network (e.g., the Internet or a telecommunications network) (not shown). The behavioral pairing module 140 may process this information to determine which agents should be paired (e.g., matched, assigned, distributed, routed) with which tasks along with other dimensions (e.g., offers, actions, channels, non-monetary rewards, monetary rewards or compensation, etc.).

For example, in an L1 state, multiple agents may be available and waiting for connection to a contact, and a task arrives at the task assignment center 100 via a network or the central switch 110. As explained above, without the behavioral pairing module 140, a switch will typically automatically distribute the new task to whichever available agent has been waiting the longest amount of time for an agent under a FIFO strategy, or whichever available agent has been determined to be the highest-performing agent under a PBR strategy. With a behavioral pairing module 140, contacts and agents may be given scores (e.g., percentiles or percentile ranges/bandwidths) according to a pairing model or other artificial intelligence data model, so that a task may be matched, paired, or otherwise connected to a preferred agent. The higher-dimensional analysis of BP decisioning will be explained in more detail below.

In an L2 state, multiple tasks are available and waiting for connection to an agent, and an agent becomes available. These tasks may be queued in a switch such as a PBX or ACD device. Without the behavioral pairing module 140, a switch will typically connect the newly available agent to whichever task has been waiting on hold in the queue for the longest amount of time as in a FIFO strategy or a PBR strategy when agent choice is not available. In some task assignment centers, priority queuing may also be incorporated, as previously explained. With a behavioral pairing module 140 in this L2 scenario, as in the L1 state described above, tasks and agents may be given percentiles (or percentile ranges/bandwidths, etc.) according to, for example, a model, such as an artificial intelligence model, so that an agent becoming available may be matched, paired, or otherwise connected to a preferred task. The higher-dimensional analysis of BP decisioning will be explained in more detail below.

Figure 2:
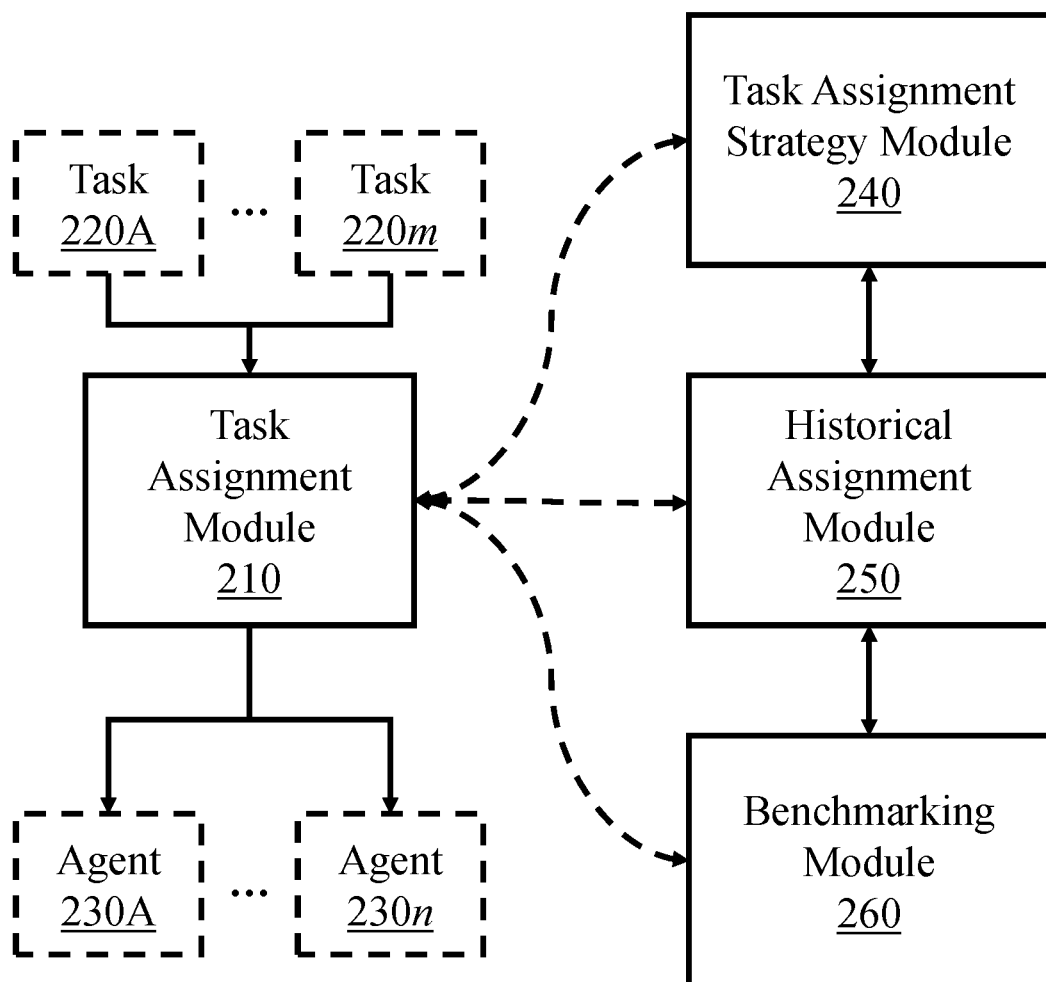
FIG. 2 shows a block diagram of a task assignment system according to embodiments of the present disclosure.

FIG. 2 shows a block diagram of a task assignment system 200 according to embodiments of the present disclosure. The task assignment system 200 may be included in a task assignment center (e.g., task assignment center 100) or incorporated in a component or module (e.g., behavioral pairing module 140) of a task assignment center for helping to assign agents among various tasks and other dimensions for grouping.

The task assignment system 200 may include a task assignment module 210 that is configured to pair (e.g., match, assign) incoming tasks to available agents. (The higher-dimensional analysis of BP decisioning will be explained in more detail below.) In the example of FIG. 2, m tasks 220A-220m are received over a given period, and n agents 230A-230n are available during the given period. Each of the m tasks may be assigned to one of the n agents for servicing or other types of task processing. In the example of FIG. 1, m and n may be arbitrarily large finite integers greater than or equal to one. In a real-world task assignment center, such as a contact center, there may be dozens, hundreds, etc. of agents logged into the contact center to interact with contacts during a shift, and the contact center may receive dozens, hundreds, thousands, etc. of contacts (e.g., telephone calls, internet chat sessions, emails, etc.) during the shift.

In some embodiments, a task assignment strategy module 240 may be communicatively coupled to and/or configured to operate in the task assignment system 200. The task assignment strategy module 240 may implement one or more task assignment strategies (or "pairing strategies") for assigning individual tasks to individual agents (e.g., pairing contacts with contact center agents). A variety of different task assignment strategies may be devised and implemented by the task assignment strategy module 240. In some embodiments, a FIFO strategy may be implemented in which, for example, the longest-waiting agent receives the next available task (in L1 environments) or the longest-waiting task is assigned to the next available agent (in L2 environments). In other embodiments, a PBR strategy for prioritizing higher-performing agents for task assignment may be implemented. Under PBR, for example, the highest-performing agent among available agents receives the next available task. In yet other embodiments, a BP strategy may be used for optimally assigning tasks to agents using information about either tasks or agents, or both. Various BP strategies may be used, such as a diagonal model BP strategy or a network flow ("off-diagonal") BP strategy. See U.S. Pat. Nos. 9,300,802; 9,781,269; 9,787,841; and 9,930,180.

In some embodiments, the task assignment strategy module 240 may implement a decisioning BP strategy that takes into account the next-best action for a task, when the task is assigned to a particular agent. For a task-agent pair, the decisioning BP strategy may also assign an action or set of actions available to the agent to complete the task. In the context of a contact center system, the action or set of actions may include an offer or a set of offers that the agent may present to a customer. For example, in a contact center system, a decisioning BP strategy may pair a contact with an agent along with an offer or set of offers available to the agent to make to a customer, based on the expected outcome of the contact-agent interaction using that particular offer or set of offers. By influencing the choices or options among offers available to an agent, a decisioning BP strategy goes beyond pairing a contact to an agent by optimizing the outcome of the individual interaction between the agent and the contact.

For example, if agent 230A loves sports, agent 230A may be more adept at selling sports packages. Therefore, sports packages may be included in agent 230A's set of offers for some or all contact types. On the other hand, agent 230B may love movies and may be more adept at selling premium movie packages; so premium movie packages may be included in agent 230B's set of offers for some or all contact types. Further, based on an artificial intelligence process such as machine learning, a decisioning BP model may automatically segment customers over a variety of variables and data types. For example, the decisioning BP model may recommend offering a package that includes sports to a first type of customer ("Customer Type 1") that may fit a particular age range, income range, and other demographic and psychographic factors. The decisioning BP model may recommend offering a premium movie package to a second type of customer ("Customer Type 2") that may fit a different age range, income range, or other demographic or psychographic factors. A decisioning BP strategy may preferably pair a Customer Type 1 with agent 230A and an offer set with a sports package, and a Customer Type 2 with agent 230B and an offer set with a premium movie package.

As with previously-disclosed BP strategies, a decisioning BP strategy optimizes the overall performance of the task assignment system rather than every individual instant task-agent pairing. For instance, in some embodiments, a decisioning BP system will not always offer sports to a Customer Type 1, nor will agent 230A always be given the option of offering deals based on a sports package. Such a scenario may arise when a marketing division of a company running a contact center system may have a budget for a finite, limited number deals (e.g., a limited number of discounted sports packages), other constraints on the frequency of certain offers, limits on the total amount of discounts (e.g., for any discount or discounted package) that can be made over a given time period, etc. Similarly, deals based on sports may sometimes be offered to a Customer Type 2, and agent 230B may sometimes be given the option of offering deals based on a sports package.

To optimize the overall performance of the task assignment system, a decisioning BP strategy may account for all types of customers waiting in a queue, agents available for customers, and any other dimensions for pairing such as the number and types of offers remaining, agent compensation or other non-monetary rewards, next-best actions, etc. In some embodiments, a probability distribution may be assigned based on the likelihood that an incoming task or customer type will accept a given offer level based on the agent being paired with the task or customer.

For example, for a Customer Type 1, if the discount offered is 0%, the likelihood of the customer accepting the offer from an average agent is 0%, and the likelihood of accepting the offer specifically from agent 230A is also 0% and from agent 230B is also 0%. For a 20% discount offer, the likelihood of the customer accepting the offer from an average agent may be 30%, whereas the likelihood of accepting the offer from agent 230A may be 60% and from agent 230B may be 25%. In a scenario where an average agent, agent 230A, and agent 230B are all assigned to the queue and available, it is possible for agent 230A to perform much higher than the average agent or agent 230B.

In some embodiments, an output measurement may be attached to each task before and after interaction with an agent. For example, a revenue number may be attached to each caller pre- and post-call. A decisioning BP system may measure the change in revenue and the influenceability of a caller based on an offer or a set of offers presented by an agent. For example, a Customer Type 1 may be more likely to renew her existing plan regardless of the discount offered, or regardless of the ability of the individual agent. A Customer Type 2 may be preferably assigned to a lower-performing agent with a higher cap on discounts in the offer set. In contrast, a Customer Type 2 may be more likely to upgrade her plans if she were paired with a higher-performing agent or an agent authorized to offer steeper discounts.

In some embodiments, a decisioning BP strategy may make sequential pairings of one or more dimensions in an arbitrary order. For example, the decisioning BP strategy may first pair an agent to a task and then pair an offer set to the agent-task pairing, then pair a reward to the agent-task-offer set pairing, and so on.

In other embodiments, a decisioning BP strategy may make "fully-coupled," simultaneous multidimensional pairings. For example, the decisioning BP strategy may consider all dimensions at once to select an optimal 4-D agent-task-offers-reward pairing.

The same task may arrive at the task assignment system multiple times (e.g., the same caller calls a call center multiple times). In these "multi-touch" scenarios, in some embodiments, the task assignment system may always assign the same item for one or more dimensions to promote consistency. For example, if a task is paired with a particular offer set the first time the task arrives, the task will be paired with the same offer set each subsequent time the task arrives (e.g., for a given issue, within a given time period, etc.).

In some embodiments, a historical assignment module 250 may be communicatively coupled to and/or configured to operate in the task assignment system 200 via other modules such as the task assignment module 210 and/or the task assignment strategy module 240. The historical assignment module 250 may be responsible for various functions such as monitoring, storing, retrieving, and/or outputting information about task-agent assignments and higher-dimensional assignments that have already been made. For example, the historical assignment module 250 may monitor the task assignment module 210 to collect information about task assignments in a given period. Each record of a historical task assignment may include information such as an agent identifier, a task or task type identifier, offer or offer set identifier, outcome information, or a pairing strategy identifier (i.e., an identifier indicating whether a task assignment was made using a BP strategy, a decisioning BP strategy, or some other pairing strategy such as a FIFO or PBR pairing strategy).

In some embodiments and for some contexts, additional information may be stored. For example, in a call center context, the historical assignment module 250 may also store information about the time a call started, the time a call ended, the phone number dialed, and the caller's phone number. For another example, in a dispatch center (e.g., "truck roll") context, the historical assignment module 250 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 250 may generate a pairing model, a decisioning BP model, or similar computer processor-generated model based on a set of historical assignments for a period of time (e.g., the past week, the past month, the past year, etc.), which may be used by the task assignment strategy module 240 to make task assignment recommendations or instructions to the task assignment module 210.

In some embodiments, instead of relying on predetermined offer sets in generating a decisioning BP model, the historical assignment module 250 may analyze historical outcome data to create or determine new or different offer sets, which are then incorporated into the decisioning BP model. This approach may be preferred when there is a budget or other limitation on the number of a particular offer set that may be made. For example, the marketing division may have limited the contact center system to five hundred discounted sports packages and five hundred discounted movie packages per month, and the company may want to optimize total revenue irrespective of how many sports and movie packages are sold, with or without a discount. Under such a scenario, the decisioning BP model may be similar to previously-disclosed BP diagonal models, except that, in addition to the "task or contact percentile" (CP) dimension and the "agent percentile" (AP) dimension, there may be a third "revenue or offer set percentile" dimension. Moreover, all three dimensions may be normalized or processed with mean regression (e.g., Bayesian mean regression (BMR) or hierarchical BMR).

In some embodiments, the historical assignment module 250 may generate a decisioning BP model that optimizes task-agent-offer set pairing based on individual channels or multi-channel interactions. The historical assignment module 250 may treat different channels differently. For example, a decisioning BP model may preferably pair a contact with different agents or offer sets depending on whether the contact calls a call center, initiates a chat session, sends an email or text message, enters a retail store, etc.

In some embodiments, the task assignment strategy module 240 may proactively create tasks or other actions (e.g., recommend outbound contact interactions, next-best actions, etc.) based on information about a contact or a customer, available agents, and available offer sets. For example, the task assignment system 200 may determine that a customer's contract is set to expire, the customer's usage is declining, or the customer's credit rating is declining. The task assignment system 200 may further determine that the customer is unlikely to renew the contract at the customer's current rate (e.g., based on information from the historical assignment module 250). The task assignment system 200 may determine that the next-best action is to call the customer (contact selection, channel selection, and timing selection), connect with a particular agent (agent selection), and give the agent the option to offer a downgrade at a particular discount or range of discounts (offer set selection). If the customer does not come to an agreement during the call, the task assignment system 200 may further determine that this customer is more likely to accept a downgrade discount offer if the agent follows up with a text message with information about the discount and how to confirm (multi-channel selection and optimization).

In some embodiment, similar to how a Kappa (κ) parameter is used to adjust/skew the agent percentile or percentile range (see U.S. Pat. No. 9,781,269) and how a Rho (ρ) parameter is used to adjust/skew the task or contact percentile or percentile range (see U.S. Pat. No. 9,787,841), the task assignment strategy module 240 may apply an Iota (ι) parameter to a third (or higher) dimension such as the offer set percentile or percentile range in a decisioning BP strategy. With the Iota parameter, the task assignment strategy module 240 may, for example, adjust the offer set percentile or percentile range (or other dimensions) to skew task-agent-offer set pairing toward higher-performing offers and imbalance offer set availability. The Iota parameter may be applied in either L1 or L2 environment and may be used in conjunction with Kappa or Rho parameter, or it may be applied with both Kappa and Rho parameters in an L3 environment. For example, if the task assignment strategy module 240 determines that the expected wait time for a contact has exceeded 100 seconds (high congestion), it may apply the Iota parameter so that an agent is more likely to have steeper discounts available to offer, which can be sold more quickly to reduce congestion and the expected wait time. More generous offers can speed up task-agent interaction, thereby reducing average handle time (AHT). When congestion is low, expected wait time may be low, and the Iota parameter may be adjusted to make only less generous offers available. These calls may take longer, and AHT may increase, but sales and revenue may be expected to increase as well.

In some embodiments, the task assignment strategy module 240 may optimize performance by optimizing for multiple business objectives or other goals simultaneously. Where the objectives are competing (e.g., discount amount and retention rates), module 240 may balance the tradeoff between the two objectives. For example, the task assignment strategy module 240 may balance increasing (or maintaining) revenue with maintaining or minimally decreasing retention rates, or it may balance decreasing (or maintaining) AHT with increasing (or maintaining) customer satisfaction, etc.

In some embodiments, the task assignment strategy module 240 may implement a decisioning BP strategy that takes into account agent compensation in lieu of an offer or offer set. The framework is similar to the description above, except that, instead of influencing a customer with an offer or offer set, the decisioning BP strategy influences the performance of an agent with a compensation that the agent may receive. In other words, instead of the task-agent-offer set three-dimensional pairing, the decisioning BP strategy makes a three-dimensional pairing of task-agent-reward. In some embodiments, a decisioning BP strategy may make a four-way pairing of task-agent-offer-reward.

A decisioning BP strategy being capable of providing variable agent compensation based on task-agent pairing may lead to better transparency and fairness. For example, some task assignment (e.g., contact center) systems may see a mix of more challenging and less challenging contacts and employ a mix of higher-performing and lower-performing agents. Under a FIFO strategy or a PBR strategy, agents of any ability are equally likely to be paired with more or less challenging contacts. Under a FIFO strategy, the overall performance of the contact center system may be low, but the average agent compensation may be transparent and fair. Under a PBR strategy, agent utilization may be skewed, and compensation may also be skewed toward higher-performing agents. Under previously-disclosed BP strategies, a more challenging contact type may be preferably paired with a higher-performing agent, whereas a less challenging contact type may be preferably paired with a lower-performing agent. For example, if a high-performing agent gets more difficult calls on average, this "call type skew" may result in the high-performing agent's conversion rate going down and compensation going down.

Therefore, adjusting an agent's compensation up or down for a given task (or contact) types may improve the fairness of compensation under the previously-disclosed BP strategies. When an agent is paired with a task or contact, a decisioning BP strategy may inform the agent of the expected value of the contact to the contact center and/or how much the agent will receive as a commission or other non-monetary reward for handling the contact or achieving a particular outcome. The decisioning BP strategy may influence the agent's behavior through offering variable compensation. For example, if the decisioning BP strategy determines that the agent should process the task or contact quickly (lower AHT, lower revenue), the decisioning BP strategy may select a lower compensation. Consequently, the agent may have less incentive to spend a lot of time earning a relatively lower commission. In contrast, if the decisioning BP strategy determines that the agent should put high effort into a higher value call (higher AHT, higher revenue), it may select a higher compensation. Such a decisioning BP strategy may maximize an agent's reward while improving the overall performance of the task assignment system 200.

The historical assignment module 250 may model a decisioning BP model based on historical information about task types, agents, and compensation amounts so that a simultaneous selection of task-agent-reward may be made. The amount of variation in compensation up or down may vary and depend on each combination of an individual agent and contact type, with the goal of improving the overall performance of the task assignment system 200.

Similar to applying the Iota parameter to the offer set or next-best action percentile or percentile range dimension, and as noted above, the task assignment strategy module 240 may apply an Iota parameter to other dimensions, such as skewing agent compensation to a greater or lesser degree, or to generally higher or generally lower values. In some embodiments, the amount and type of Iota parameter applied to agent compensation or other non-monetary rewards may be based at least in part on factors in the task assignment system 200 (e.g., the expected wait time of callers on hold in a call center).

In some embodiments that employ strategies that are similar to the diagonal model BP strategy, a variable compensation may be viewed as temporarily influencing the effective agent percentile (AP) of an available agent to be higher or lower, in order to move an available contact-agent pairing closer to the optimal diagonal. Similarly, adjusting the value of offers to be higher or lower may be viewed as influencing the effective contact percentile (CP) of a waiting contact to be higher or lower, in order to move an available contact-agent pairing closer to the optimal diagonal.

In some embodiments, a benchmarking module 260 may be communicatively coupled to and/or configured to operate in the task assignment system 200 via other modules such as the task assignment module 210 and/or the historical assignment module 250. The benchmarking module 260 may benchmark the relative performance of two or more pairing strategies (e.g., FIFO, PBR, BP, decisioning BP, etc.) using historical assignment information, which may be received from, for example, the historical assignment module 250. In some embodiments, the benchmarking module 260 may perform other functions, such as establishing a benchmarking schedule for cycling among various pairing strategies, tracking cohorts (e.g., base and measurement groups of historical assignments), etc. Benchmarking is described in detail for the contact center context in, e.g., U.S. Pat. No. 9,712,676, which is hereby incorporated by reference herein.

In some embodiments, the benchmarking module 260 may output or otherwise report or use the relative performance measurements. The relative performance measurements may be used to assess the quality of the task assignment strategy to determine, for example, whether a different task assignment strategy (or a different pairing model) should be used, or to measure the overall performance (or performance gain) that was achieved within the task assignment system 200 while it was optimized or otherwise configured to use one task assignment strategy instead of another.

In some embodiments, the benchmarking module 260 may benchmark a decisioning BP strategy against one or more alternative pairing strategies such as FIFO in conjunction with offer set availability. For example, in a contact center system, agents may have a matrix of nine offers-three tiers of service levels, each with three discount levels. During "off" calls, the longest-waiting agent may be connected to the longest-waiting caller, and the agent may offer any of the nine offers. A high-performing agent may be more likely to sell a higher tier of service at a higher price, whereas a lower-performing agent may not try as hard and go immediately to offering the biggest discounts. During "on" calls, the decisioning BP strategy may pair contacts with agents but limit agents to a subset of the nine available offers. For example, for some contact types, a higher-performing agent may be empowered to make any of the nine offers, whereas a lower-performing agent may be limited to offer only the smaller discount for certain tiers, if the task assignment strategy module 240 determines, based on the decisioning BP model, that the overall performance of the contact center system may be optimized by selectively limiting the offer sets in a given way for a given contact-agent pairing. Additionally, if a provider (e.g., vendor) that provides a task assignment system with decisioning BP strategy uses a benchmarking and revenue sharing business model, the provider may contribute a share of benchmarked revenue gain to the agent compensation pool.

In some embodiments, the task assignment system 200 may offer dashboards, visualizations, or other analytics and interfaces to improve overall performance of the system. For each agent, the analytics provided may vary depending on the relative ability or behavioral characteristics of an agent. For example, competitive or higher-performing agents may benefit from a rankings widget or other "gamification" elements (e.g., badges or achievements to unlock points and score boards, notifications when agents overtake one another in the rankings, etc.). On the other hand, less competitive or lower-performing agents may benefit from periodic messages of encouragement, recommendations on training/education sessions, etc.

Figure 3:
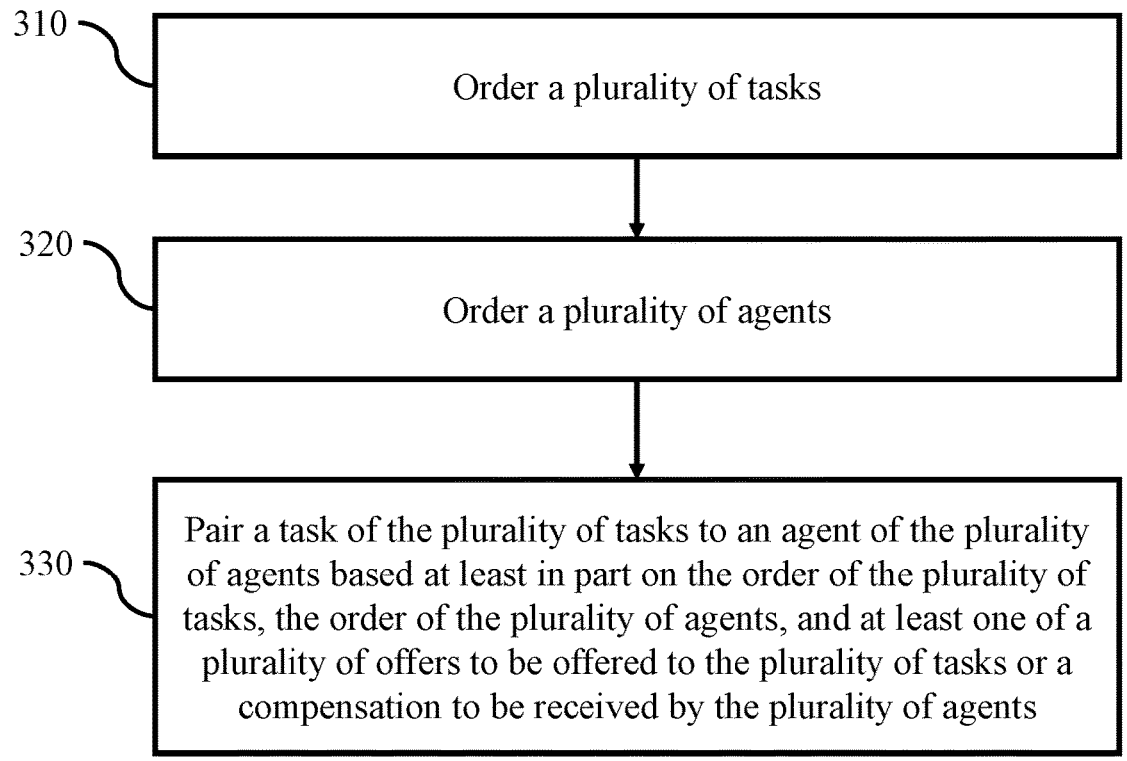
FIG. 3 shows a flow diagram of a task assignment method according to embodiments of the present disclosure.

FIG. 3 shows a task assignment method 300 according to embodiments of the present disclosure.

Task assignment method 300 may begin at block 310. At block 310, the task assignment method 300 may order a plurality of tasks, which may be in queue in a task assignment system (e.g., task assignment system 200). The task assignment method 300 may order the plurality of tasks by giving them percentiles or percentile ranges according to, for example, a model, such as an artificial intelligence model. In a contact center system, contacts may be ordered according to how long each contact has been waiting for an assignment to an agent relative to the other contacts, or how well each contact contributes to performance of the contact center system for some metric relative to the other contacts. In other embodiments, the plurality of tasks may be analyzed according to an "off-diagonal" model (e.g., a network flow model).

Task assignment method 300 may then proceed to block 320. At block 320, the task assignment method 300 may order a plurality of agents, who may be available in the task assignment system. The task assignment method 300 may order the plurality of agents by giving them percentiles or percentile ranges according to, for example, a model, such as an artificial intelligence model. In a contact center system, agents may be ordered according to how long each agent has been waiting for an assignment to a contact relative to the other agents, or how well each agent contributes to performance of the contact center system for some metric relative to the other agent. In other embodiments, the plurality of tasks may be analyzed according to a network flow model.

Task assignment method 300 may then proceed to block 330. At block 330, the task assignment method 300 may pair a task of the plurality of tasks to an agent of the plurality of agents. In some embodiments, the task-agent pairing may be based at least in part on the order of the plurality of tasks, the order of the plurality of agents, and at least one of a plurality of offers to be offered to the plurality of tasks or a compensation to be received by at least one of the plurality of agents. In some embodiments, the task-agent pairing may be based on an alternative behavioral pairing technique such as a network flow model.

In some embodiments, the task assignment method 300 may subsequently select an offer or offer set and/or an agent reward to be used in conjunction the task-agent pairing. In other embodiments, the task assignment method 300 may perform a three-way pairing (e.g., task-agent-offers, task-agent-reward, etc.) or a four-way pairing (e.g., task-agent-offer-reward). A given offer may skew or adjust the percentile or percentile range of task, while a given compensation may skew or adjust the percentile or percentile range of agent. Therefore, by considering at least one offer or a compensation, the task assignment method 300 is able to select a task-agent (or task-agent-offer, task-agent-compensation, task-agent-offer-compensation, etc.) pairing that improves the overall performance of the task assignment system.

At this point it should be noted that task assignment in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with task assignment in accordance with the present disclosure as described above. Alternatively, one or more processors operating in accordance with instructions may implement the functions associated with task assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for decisioning behavioral pairing in a task assignment system comprising:
    determining, by at least one computer processor communicatively coupled to and configured to operate in the task assignment system, a plurality of possible task-agent pairings among a plurality of tasks waiting for assignment and at least one agent available for assignment; and
    selecting, by the least one computer processor for assignment in the task assignment system, a first task-agent pairing of the plurality of possible task-agent pairings based at least in part on a first offer set of a plurality of potential offer sets to be offered by the agent in the first task-agent pairing or a first compensation of a plurality of potential compensations to be received by the agent in the first task-agent pairing.

2. The method of claim 1, wherein the task assignment system is a contact center system.

3. The method of claim 1, wherein the selecting is based at least in part on both the first offer set and the first compensation.

4. The method of claim 1, further comprising:
    selecting, by the at least one computer processor, the first offer set from the plurality of potential offer sets.

5. The method of claim 1, further comprising:
    selecting, by the at least one computer processor, the first compensation from the plurality of potential compensations.

6. The method of claim 1, wherein the selecting is based on at least one of a first ordering of a plurality of tasks and a second ordering of a plurality of agents, and wherein the at least one of the first and second orderings is expressed as percentiles or percentile ranges.

7. The method of claim 6, further comprising adjusting, by the at least one computer processor, the first offer set or the first compensation to adjust the first or second orderings.

8. A system for decisioning behavioral pairing in a task assignment system comprising:
    at least one computer processor communicatively coupled to and configured to operate in the task assignment system, wherein the at least one computer processor is further configured to:
        determine a plurality of possible task-agent pairings among a plurality of tasks waiting for assignment and at least one agent available for assignment; and
        selecting, for assignment in the task assignment system, a first task-agent pairing of the plurality of possible task-agent pairings based at least in part on a first offer set of a plurality of potential offer sets to be offered by the agent in the first task-agent pairing or a first compensation of a plurality of potential compensations to be received by the agent in the first task-agent pairing.

9. The system of claim 8, wherein the task assignment system is a contact center system.

10. The system of claim 8, wherein the at least one computer processor is configured to select the first task-agent pairing based at least in part on both the first offer set and the first compensation.

11. The system of claim 8, wherein the at least one computer processor is further configured to select the first offer set from the plurality of potential offer sets.

12. The system of claim 8, wherein the at least one computer processor is further configured to select the first compensation from the plurality of potential compensations.

13. The system of claim 8, wherein the at least one computer processor is configured to select the first task-agent pairing based on at least one of a first ordering of a plurality of tasks and a second ordering of a plurality of agents, and wherein the at least one of the first and second orderings is expressed as percentiles or percentile ranges.

14. The system of claim 13, wherein the at least one computer processor is further configured to adjust the first offer set or the first compensation to adjust the first or second orderings.

15. An article of manufacture for decisioning behavioral pairing in a task assignment system comprising:
a non-transitory processor readable medium; and
instructions stored on the medium;
wherein the instructions are configured to be readable from the medium by at least one computer processor communicatively coupled to and configured to operate in the task assignment system and thereby cause the at least one computer processor to operate so as to:
determine a plurality of possible task-agent pairings among a plurality of tasks waiting for assignment and at least one agent available for assignment; and
select, for assignment in the task assignment system, a first task-agent pairing of the plurality of possible task-agent pairings based at least in part on a first offer set of a plurality of potential offer sets to be offered by the agent in the first task-agent pairing or a first compensation of a plurality of potential compensations to be received by the agent in the first task-agent pairing.

16. The article of manufacture of claim 15, wherein the task assignment system is a contact center system.

17. The article of manufacture of claim 15, wherein the instructions are configured to cause the at least one computer processor to operate so as to select the first task-agent pairing based at least in part on both the first offer set and the first compensation.

18. The article of manufacture of claim 15, wherein the instructions are further configured to cause the at least one computer processor to operate so as to select the first offer set from the plurality of potential offer sets.

19. The article of manufacture of claim 15, wherein the instructions are further configured to cause the at least one computer processor to operate so as to select the first compensation from the plurality of potential compensations.

20. The article of manufacture of claim 15, wherein the instructions are configured to cause the at least one computer processor to operate so as to select the first task-agent pairing based on at least one of a first ordering of a plurality of tasks and a second ordering of a plurality of agents, and wherein the at least one of the first and second orderings is expressed as percentiles or percentile ranges.

21. The article of manufacture of claim 20, wherein the instructions are further configured to cause the at least one computer processor to operate so as to adjust the first offer set or the first compensation to adjust the first or second orderings.

* * * * *